(12) United States Patent
Waltermann et al.

(10) Patent No.: US 11,610,141 B2
(45) Date of Patent: Mar. 21, 2023

(54) CLASSIFYING A DATASET FOR MODEL EMPLOYMENT

(71) Applicant: Lenovo (Singapore) Pte. Ltd., Singapore (SG)

(72) Inventors: Rod D. Waltermann, Rougemont, NC (US); Sidney Rhodes, Chapel Hill, NC (US); Saba Shah, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1027 days.

(21) Appl. No.: 16/368,999

(22) Filed: Mar. 29, 2019

(65) Prior Publication Data

US 2020/0311570 A1 Oct. 1, 2020

(51) Int. Cl.
*G06N 5/04* (2006.01)
*G06N 20/20* (2019.01)
*G06K 9/62* (2022.01)

(52) U.S. Cl.
CPC ............ *G06N 5/04* (2013.01); *G06K 9/6218* (2013.01); *G06K 9/6267* (2013.01); *G06N 20/20* (2019.01)

(58) Field of Classification Search
CPC .......... G06N 5/04; G06N 20/20; G06N 20/00; G06K 9/6218; G06K 9/6267
See application file for complete search history.

(56) References Cited

U.S. PATENT DOCUMENTS

| 10,013,416 B1 * | 7/2018 | Bhardwaj | G06F 40/30 |
| 10,909,174 B1 * | 2/2021 | Martin | G06F 16/75 |
| 10,916,333 B1 * | 2/2021 | Yeturu | G06N 5/003 |
| 2012/0123976 A1 * | 5/2012 | Wang | G06N 20/00 707/723 |
| 2013/0100849 A1 * | 4/2013 | Szabo | G06K 9/6267 370/253 |
| 2019/0325333 A1 * | 10/2019 | Chan | G06N 20/00 |
| 2020/0090009 A1 * | 3/2020 | Arora | G06K 9/00496 |
| 2020/0106792 A1 * | 4/2020 | Louie | H04L 63/1483 |

* cited by examiner

*Primary Examiner* — Dinh Nguyen
(74) *Attorney, Agent, or Firm* — Ference & Associates LLC

(57) ABSTRACT

One embodiment provides a method, including: obtaining a dataset for generation of an outcome using a plurality of artificial intelligence models; classifying, using another artificial intelligence model and before employing the plurality of artificial intelligence models, the dataset into a feature-space; and employing a subset of the plurality of artificial intelligence models on the dataset, wherein the subset is selected based upon the classification of the dataset. Other aspects are described and claimed.

18 Claims, 3 Drawing Sheets

CLASSIFYING A DATASET FOR MODEL EMPLOYMENT

BACKGROUND

Artificial intelligence models are becoming commonplace for performing many different functions. For example, these types of models may be employed to make predictions regarding a dataset, provide recommendations to or with respect to applications, determining if an application is performing as expected, or the like. The artificial intelligence model receives a dataset as input, identify features of the dataset, and then use the features to provide an output or outcome (e.g., prediction, recommendation, etc.) based upon the dataset. The artificial intelligence model is generally built with a specific problem in mind. Therefore, the artificial intelligence model is specific to solving the specific problem and possibly predicting a particular outcome.

BRIEF SUMMARY

In summary, one aspect provides a method, comprising: obtaining a dataset for generation of an outcome using a plurality of artificial intelligence models; classifying, using another artificial intelligence model and before employing the plurality of artificial intelligence models, the dataset into a feature-space; and employing a subset of the plurality of artificial intelligence models on the dataset, wherein the subset is selected based upon the classification of the dataset.

Another aspect provides an information handling device, comprising: a processor; a memory device that stores instructions executable by the processor to: obtain a dataset for generation of an outcome using a plurality of artificial intelligence models; classify, using another artificial intelligence model and before employing the plurality of artificial intelligence models, the dataset into a feature-space; and employ a subset of the plurality of artificial intelligence models on the dataset, wherein the subset is selected based upon the classification of the dataset.

A further aspect provides a product, comprising: a storage device that stores code, the code being executable by a processor and comprising: code that obtains a dataset for generation of an outcome using a plurality of artificial intelligence models; code that classifies, using another artificial intelligence model and before employing the plurality of artificial intelligence models, the dataset into a feature-space; and code that employs a subset of the plurality of artificial intelligence models on the dataset, wherein the subset is selected based upon the classification of the dataset.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
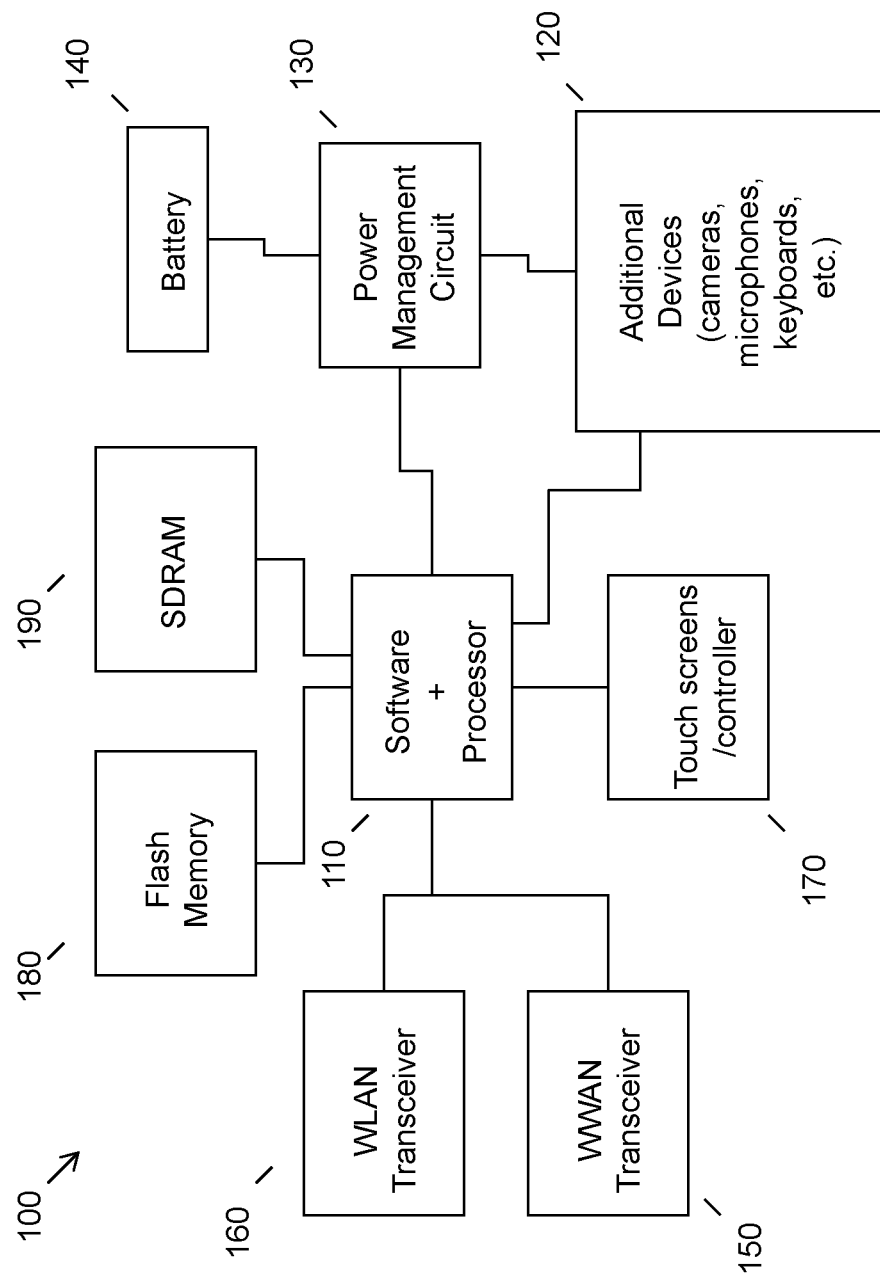
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In order for an artificial intelligence model to provide an outcome for a dataset, the dataset is broken up into many different features. These features are used by the model to solve the problem. However, the number of possible different features for a particular problem can quickly result in a very large number of features for analysis by the model. As the number of features increase, the computational power and resources needed by the model also increase. Additionally, as more features are added to the model, the time needed to process the dataset using the model also increases.

A common solution to this problem, where all the features are important or not separable, is to break the problem up into subsets and apply a smaller model on these subsets. In other words, smaller models may be generated for a particular aspect of the problem or a particular combination of features. Since these smaller models have a smaller number of features, the computational power and resources and time needed to process the dataset using the model is decreased as compared to the larger model. Therefore, employment of the smaller models is computationally cheaper and more efficient than employment of the larger model.

However, in order to receive an accurate output or outcome, the system has to process the dataset using each of the smaller models. Additionally, the system typically does not know what problem the dataset corresponds to. In other words, the system typically does not know what features produced the dataset. Therefore, the dataset has to be processed using each of the smaller models. The system then selects the outcome from the model having the highest probability or highest accuracy. Due to the fact that there are a number of these smaller models, the computational power and resources and time needed to process the dataset using all of the smaller models is not a significant computational or time savings as compared to the larger model.

Accordingly, an embodiment provides a method for classifying a dataset using an artificial intelligence model to identify a subset of artificial intelligence models to employ on the dataset. An embodiment obtains a dataset that needs an outcome generation, where the outcome is generated using one or more artificial intelligence models. Generally, the dataset is obtained for application of a plurality of smaller artificial intelligence models that each have a smaller set of features as compared to a larger model. Before employing the artificial intelligence models on the dataset, an embodiment classifies, using another artificial intelligence model, the dataset into a feature-space. In other words, an embodiment classifies the dataset into a particular problem or particular aspect of a larger problem. An embodiment can then identify a subset of the artificial intelligence models to employ on the dataset based upon the classification. For example, an embodiment can analyze the data elements of the features to form a data distribution set, that can then be clustered to determine a subset of models to apply to this data distribution without sacrificing accuracy of the conventional techniques. Thus, the described system provides a computationally cheaper and more efficient system than conventional techniques without sacrificing the accuracy of the conventional techniques.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, external keyboard, other input devices, etc. System 100 often includes one or more touch screens 170 for data input and display/rendering. System 100 also typically includes various memory devices, for example flash memory 180 and SDRAM 190.

Figure 2:
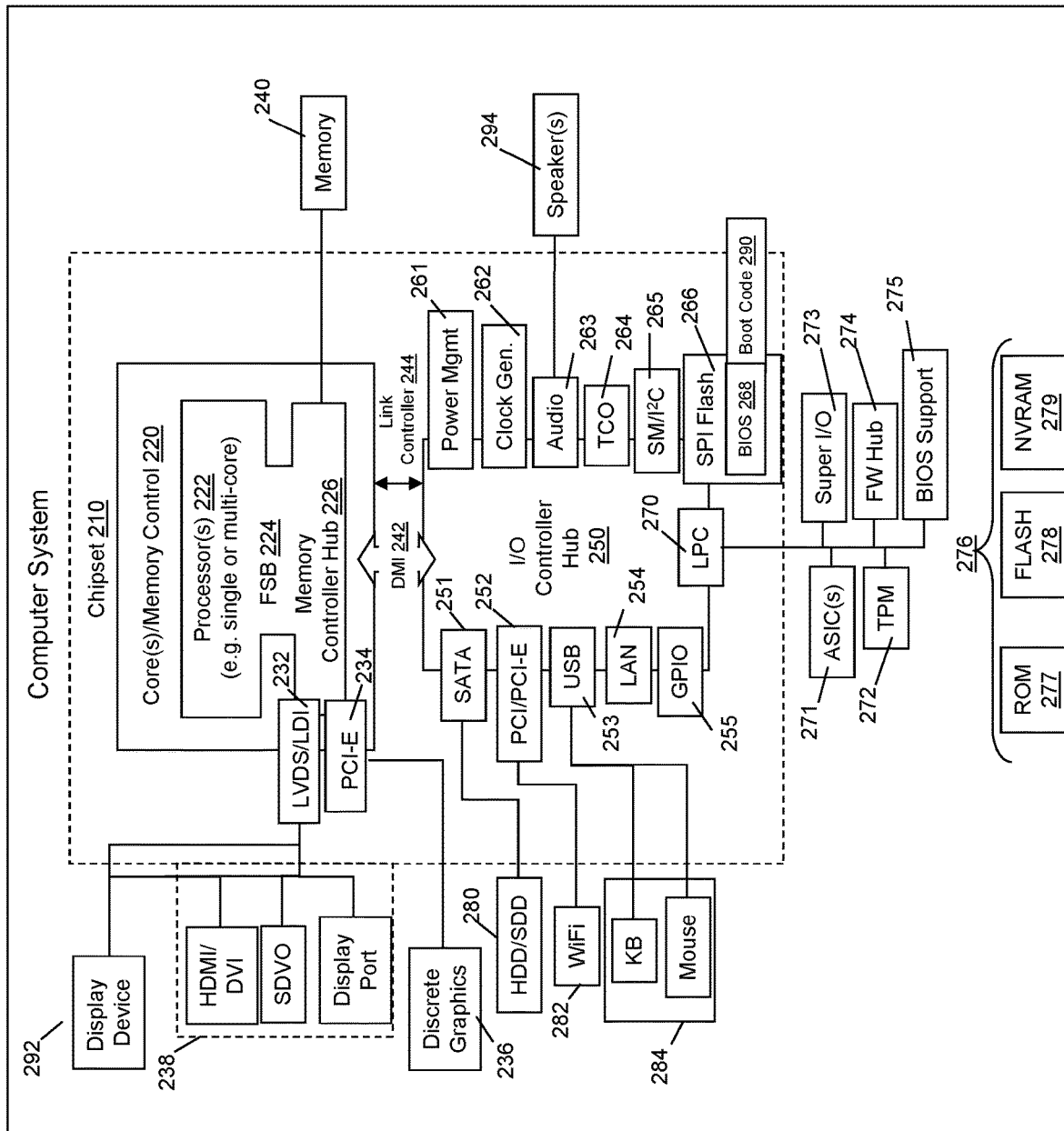
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, laptops, personal computer devices generally, and/or other electronic devices that may be capable of engaging in online conference applications. For example, the circuitry outlined in FIG. 1 may be implemented in a tablet or smart phone embodiment, whereas the circuitry outlined in FIG. 2 may be implemented in a laptop.

Figure 3:
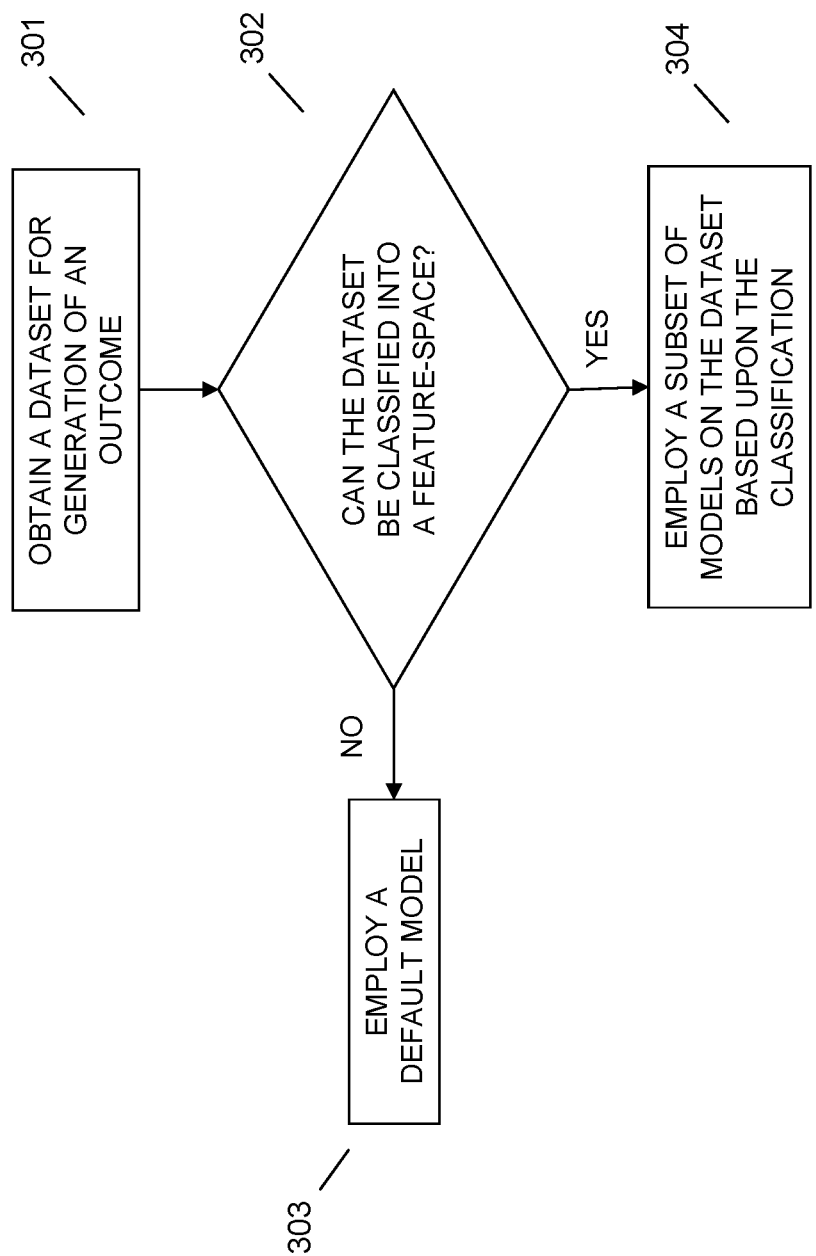
FIG. 3 illustrates an example method of classifying a dataset using an artificial intelligence model to identify a subset of artificial intelligence models to employ on the dataset.

Referring now to FIG. 3, an embodiment may classify a dataset using an artificial intelligence model to identify a subset of artificial intelligence models to employ on the dataset. At 301, an embodiment may obtain a dataset needing an outcome generated. For example, an embodiment may obtain a dataset requiring a prediction, recommendation, or the like. As a working example, the dataset may be a dataset including information related to a device crash. In this example, the dataset may include information related to the device (e.g., model, make, manufacture date, manufacturer, etc.), the drivers that were running at the time of the crash, the applications that were running at the time of the crash, and the like. All of the pieces of information are referred to as features with respect to artificial intelligence models. In other words, the device model would be one feature; a particular driver would be another feature, and so on.

While the example of a computer crash will be used here throughout, it should be understood that the dataset can include any dataset that could be processed and analyzed using one or more artificial intelligence models. For example, another common use of artificial intelligence models is in the context of natural language processing to identify a particular word or phrase spoken by a user. Another common use of artificial intelligence models is in the context of generation of machine-learning models. As a final example, another common use of artificial intelligence models is in programming and controlling robots. Thus, the described systems and methods can be used with any of these use cases and any other of the multitude of use cases that employ artificial intelligence models.

The dataset may be obtained by accessing the dataset, receiving the dataset, or otherwise obtaining the dataset. The dataset may be obtained for provision of an outcome using a plurality of artificial intelligence models, where each of the artificial intelligence models can generate an outcome using the dataset. For example, the dataset may be received within an application or system already having access to or containing the models. As another example, the dataset may be stored in a data store and the models may then be run on the dataset (e.g., the system already has access to the dataset and then receives the models for providing the outcome, etc.). As another example, both the dataset and the models may be received at a system or application that runs the received models against the received dataset.

The plurality of artificial intelligence models may be smaller models that are related to a larger problem. In other words, the plurality of artificial intelligence models may be subsets of a larger artificial intelligence model, with each of the smaller models being related to a particular aspect, domain, or subset of features of the larger artificial intelligence model. For example, if the overall domain is device crash data, the larger model may include all the possible features related to device crash data. Thus, each of the smaller models may include only a subset of the features of the larger model, for example, particular combinations of drivers and applications. The outcome that can be generated by the artificial intelligence model may be a prediction, recommendation, or the like. Using the working example, the outcome may be a prediction of the combination of features (e.g., drivers, applications, device information, etc.) that caused the device crash. In this example, the outcome may also include a recommendation for fixing the problem that caused the device crash.

At 302, an embodiment may determine whether the dataset can be classified into a feature-space before employment of any of the models. In other words, instead of processing and analyzing the dataset using all of the models, as in conventional systems, an embodiment first attempts to classify the dataset. Classifying the dataset may include classifying the dataset into a feature-space. In other words, classifying the dataset may include identifying features included in the dataset to determine a domain of the dataset. Upon identification of the feature-space, an embodiment can identify a domain, feature, or aspect of the overall problem corresponding to the dataset.

To classify the dataset, an embodiment may employ another artificial intelligence model different than the artificial intelligence models to be used for providing an outcome related to the dataset. This other artificial intelligence model will be referred to as a second artificial intelligence model for ease of reading. However, it should be understood that embodiments likely include many more than two artificial intelligence models. Specifically, the number of artificial intelligence models of step 301 is greater than a single artificial intelligence model. Additionally, the artificial intelligence model that is used to classify the dataset may include more than one artificial intelligence model. The second artificial intelligence model is not employed to actually provide an outcome with relation to the dataset. Rather, the second artificial intelligence model is simply intended to predict which of the artificial intelligence models that can generate an outcome with respect to the dataset would provide the most accurate outcome or have the highest probability of being able to provide an outcome with respect to the dataset. In other words, the second artificial intelligence model is use to pre-classify the dataset into which of the artificial intelligence problem models that the dataset likely fits. Thus, embodiments use an artificial intelligence model to predict which artificial intelligence model to use to generate an outcome with respect to the dataset.

To classify the dataset, an embodiment may use crowd-sourced data. In other words, the second artificial intelligence model may be trained or generated using crowd-sourced data. For example, the crowd-sourced data may indicate a common problem or domain that is related to particular features. Using the working example, the crowd-sourced data may indicate that a particular driver and application combination causes device crashes on a particular device. This particular driver and application combination along with the particular device may then allow for classification of the dataset into a feature-space based upon the combination. In using the crowd-sourced data an embodiment may compare the dataset, a subset of the dataset, or features of the dataset to different crowd-source artificial intelligence model pools. If, based upon the comparison, an embodiment identifies a pool having or matching the dataset, subset of the dataset, or features of the dataset, an embodiment may classify the dataset into that artificial intelligence model pool.

An embodiment may also use clustering data to classify the dataset. Clustering may include comparing the dataset to one or more artificial intelligence models or artificial intelligence model domains. An embodiment may use a clustering algorithm to calculate a clustering distance of the dataset with respect to the compared models or model domains. A clustering distance within a predetermined threshold distance indicates a similarity of the dataset with respect to the compared model or model domain. A clustering distance outside the predetermined threshold distance would indicate that the dataset does not have a similarity, or has low similarity, with respect to the compared model or model domain. The clustering data may be used in conjunction with the crowd-sourced artificial intelligence model pools. In other words, an embodiment may use a clustering technique with the dataset against the crowd-sourced artificial intelligence model pools. If the dataset is clustered with a particular model pool, then the dataset is classified into that model pool.

If the dataset cannot be classified into a feature-space at 302, an embodiment may employ a default model or all of the models at 303. In other words, in the event that the dataset cannot be classified then an embodiment may work like a traditional model system employing all of the models. Stated differently, responsive to determining that none of the plurality of artificial intelligence models match the classification, the subset of artificial intelligence models that are employed includes at least one default artificial intelligence model. Additionally, the subset may include all of the artificial intelligence models of 301. Either some or all of the models, some or all of the subset of models, and/or the default artificial intelligence model may be custom-trained or custom-tuned artificial intelligence models for a particular user. In the example of using crowd-sourced model pools and/or clustering data, determining that the dataset cannot be classified may include identifying that the dataset is a predetermined distance, referring to a clustering distance determination, from a model pool.

However, if the dataset can be classified into a feature-space at 302, an embodiment may employ a subset of the models at 304. Again, the subset may include all of the artificial intelligence models. However, to make the system computationally cheaper and more efficient, the subset includes less than the total number of artificial intelligence models. The subset that is selected is based upon the classification of the dataset. For example, the subset may be selected based upon identifying which of the artificial intelligence models have a feature-space matching the feature-space of the dataset. As another example, the subset may be selected based upon identifying which of the artificial intelligence models have a likelihood of an accurate outcome above a predetermined threshold. The threshold may be set by a user or may be a default setting.

Determining which artificial intelligence models that have a likelihood of an accurate outcome may be based upon the classification, for example, the crowd-sourced data or clustering classification. For example, if an embodiment determines that the dataset can be clustered with an artificial intelligence model or model domain, an embodiment may determine that the use of the artificial intelligence model or model domain that the dataset is clustered with would result in a high likelihood of an accurate outcome. Similarly, if an embodiment determines that the dataset matches or is similar to a model or model domain based upon crowd-sourced data, an embodiment may determine that a high likelihood of an accurate outcome exists using that model or model domain.

Once the subset is employed an embodiment may generate an outcome based upon processing and analyzing the dataset using the employed subset. This outcome may be a recommendation to address a problem identified within the dataset, a prediction associated with the dataset, or any other outcome that can be provided by an artificial intelligence model. Using the working example, the outcome may include a prediction of which drivers and/or applications caused the device crash. The outcome may also include a recommendation of what the user could do to prevent a similar device crash, for example, update an outdated driver, uninstall/reinstall an application, disable a driver when running a particular application, or the like. The outcome may then be provided to a user. The outcome may also be used to further train the second artificial intelligence model. For example, if the outcome is determined to be accurate, an embodiment may identify the subset that was employed resulting in an accurate outcome and, therefore, should be used when a subsequent dataset has a similar feature-space. The second artificial intelligence model can then be updated with this information.

The various embodiments described herein thus represent a technical improvement to conventional artificial intelligence model employment. Rather than using a large model to analyze a dataset, which is computationally expensive and inefficient, the system employs smaller models having a smaller feature set. Additionally, rather than conventional systems which analyze the dataset using all the smaller models, the system can classify the dataset into a feature-space which allows for predicting which of the smaller models should be used for the dataset analysis. Thus, the described system and method only employs a subset of the smaller models instead of all the smaller models. Accordingly, the described system and method is computationally cheaper and more efficient than the traditional system of either a single large model or employment of all a large number of smaller models. Additionally, the described system and method does not reduce the accuracy of the outcome as compared to the accuracy of outcomes provided by conventional systems.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, R F, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   obtaining a dataset for generation of an outcome using a plurality of artificial intelligence models;
   classifying, using another artificial intelligence model and before employing the plurality of artificial intelligence models, the dataset into a feature-space; and
   employing a subset of the plurality of artificial intelligence models on the dataset, wherein the subset is selected based upon the classification of the dataset, wherein the subset is selected based at least in part upon an identification of a subset of the plurality of artificial intelligence models having a likelihood of an accurate outcome above a predetermined threshold.

2. The method of claim 1, wherein the subset is selected based upon an identification of a subset of the plurality of artificial intelligence models that have a feature-space matching the feature-space of the classification.

3. The method of claim 1, wherein the employed subset generates an outcome based upon the dataset.

4. The method of claim 3, wherein the outcome generated by the employed subset is used to further train the another artificial intelligence model.

5. The method of claim 3, wherein the outcome comprises a recommendation for addressing a problem identified from the dataset.

6. The method of claim 3, wherein the outcome comprises a prediction associated with the dataset.

7. The method of claim 1, wherein the another artificial intelligence model classifies the dataset based upon crowd-sourced data.

8. The method of claim 1, wherein the another artificial intelligence model classifies the dataset based upon clustering data.

9. The method of claim 1, wherein, responsive to determining that none of the plurality of artificial intelligence models match the classification, the employed subset comprises at least one default artificial intelligence model.

10. An information handling device, comprising:
    a processor;
    a memory device that stores instructions executable by the processor to:
    obtain a dataset for generation of an outcome using a plurality of artificial intelligence models;
    classify, using another artificial intelligence model and before employing the plurality of artificial intelligence models, the dataset into a feature-space; and
    employ a subset of the plurality of artificial intelligence models on the dataset, wherein the subset is selected based upon the classification of the dataset, wherein the subset is selected based at least in part upon an identification of a subset of the plurality of artificial intelligence models having a likelihood of an accurate outcome above a predetermined threshold.

11. The information handling device of claim 10, wherein the subset is selected based upon an identification of a subset of the plurality of artificial intelligence models that have a feature-space matching the feature-space of the classification.

12. The information handling device of claim 10, wherein the employed subset generates an outcome based upon the dataset.

13. The information handling device of claim 12, wherein the outcome generated by the employed subset is used to further train the another artificial intelligence model.

14. The information handling device of claim 12, wherein the outcome comprises a recommendation for addressing a problem identified from the dataset.

15. The information handling device of claim 12, wherein the outcome comprises a prediction associated with the dataset.

16. The information handling device of claim 10, wherein the another artificial intelligence model classifies the dataset based upon at least one of: crowd-sourced data and clustering data.

17. The information handling device of claim 10, wherein, responsive to determining that none of the plurality of artificial intelligence models match the classification, the employed subset comprises at least one default artificial intelligence model.

18. A product, comprising:
    a storage device that stores code, the code being executable by a processor and comprising:
    code that obtains a dataset for generation of an outcome using a plurality of artificial intelligence models;

code that classifies, using another artificial intelligence model and before employing the plurality of artificial intelligence models, the dataset into a feature-space; and code that employs a subset of the plurality of artificial intelligence models on the dataset, wherein the subset is selected based upon the classification of the dataset, wherein the subset is selected based at least in part upon an identification of a subset of the plurality of artificial intelligence models having a likelihood of an accurate outcome above a predetermined threshold.

\* \* \* \* \*